US006970720B2

(12) United States Patent
Kim et al.

(10) Patent No.: US 6,970,720 B2
(45) Date of Patent: Nov. 29, 2005

(54) SERVICE APPARATUS FOR A PUBLIC AND PRIVATE MOBILE COMMUNICATION NETWORK

(75) Inventors: Ha-Hong Kim, Seoul (KR); Gui-Jung Lee, Yong-in-shi (KR); Doo-Yong Yang, Seoul (KR)

(73) Assignee: Samsung Electronics, Co. Ltd., Suwon-si (KR)

( * ) Notice: Subject to any disclaimer, the term of this patent is extended or adjusted under 35 U.S.C. 154(b) by 791 days.

(21) Appl. No.: 09/912,574

(22) Filed: Jul. 26, 2001

(65) Prior Publication Data
US 2002/0022497 A1 Feb. 21, 2002

(30) Foreign Application Priority Data
Aug. 18, 2000 (KR) ................ 2000-47774

(51) Int. Cl.[7] ............. H04B 1/38; H04M 1/00; H04Q 7/20
(52) U.S. Cl. .................. 455/554.1; 455/445
(58) Field of Search ............ 455/554.1, 554.2, 455/555, 560, 561, 421, 422.1, 426.1, 426.2, 455/462, 452.1, 450

(56) References Cited

U.S. PATENT DOCUMENTS

| | | | |
|---|---|---|---|
| 5,303,287 A | 4/1994 | Laborde | 455/426.1 |
| 5,537,610 A | 7/1996 | Mauger et al. | 455/435.3 |
| 5,818,824 A * | 10/1998 | Lu et al. | 370/328 |
| 5,890,064 A | 3/1999 | Widergen et al. | 455/445 |
| 6,047,176 A * | 4/2000 | Sakamoto et al. | 455/422.1 |
| 6,073,018 A | 6/2000 | Sallberg | 455/435.2 |
| 6,073,029 A | 6/2000 | Smith et al. | 455/555 |
| 6,097,966 A | 8/2000 | Hanley | 455/555 |
| 6,351,649 B1 * | 2/2002 | Watanabe et al. | 455/501 |
| 6,493,550 B1 * | 12/2002 | Raith | 455/422.1 |
| 6,539,237 B1 * | 3/2003 | Sayers et al. | 455/555 |
| 2001/0046860 A1 * | 11/2001 | Lee | 455/426 |
| 2003/0036409 A1 * | 2/2003 | Sato et al. | 455/561 |

FOREIGN PATENT DOCUMENTS

| | | |
|---|---|---|
| WO | WO 96 35309 A | 11/1996 |
| WO | WO 98 09457 A | 3/1998 |
| WO | WO 01 41478 A | 7/2001 |

OTHER PUBLICATIONS

Communication issued by the European Patent Office dated Jul. 5, 2002.
Communication issued by the European Patent Office dated Feb. 20, 2002.

* cited by examiner

Primary Examiner—Benny Q. Tieu
(74) Attorney, Agent, or Firm—Robert E. Bushnell, Esq.

(57) ABSTRACT

A service apparatus for a public and private mobile communication network in a mobile communication service system including a public mobile communication network and a private mobile communication network. The service apparatus includes a device for connecting a public mobile communication service system to a private mobile communication service system, and providing a mobile station in a predetermined service area with both a public mobile communication service and a private mobile communication service. The device includes a base station transceiver subsystem (BTS) located in the predetermined service area, for forming a radio channel to the mobile station in the service area; a communication path provider connected to the BTS, a base station controller (BSC) in the public mobile communication service system and a mobile switching center (MSC) of the private mobile communication service system, said communication path provider providing a communication path for transmitting data of the service system and data of the BTS; and a call manager for distinguishing the public mobile communication service from the private mobile communication service by analyzing data received through the communication path, and performing call management for the corresponding service.

9 Claims, 3 Drawing Sheets

SERVICE APPARATUS FOR A PUBLIC AND PRIVATE MOBILE COMMUNICATION NETWORK

CLAIM OF PRIORITY

This application makes reference to, incorporates the same herein, and claims all benefits accruing under 35 U.S.C § 119 from an application entitled Service Apparatus for a Public and Private Mobile Communication Network earlier filed in the Korean Industrial Property Office on Aug. 18, 2000, and there duly assigned Serial No. 2000-47774 by that Office.

BACKGROUND OF THE INVENTION

1. Field of the Invention

The present invention relates generally to a mobile communication system, and in particular, to a service apparatus for a public and private mobile communication network.

2. Description of the Related Art

Existing mobile communication systems are designed to support either a public mobile communication service or a private mobile communication service, so that a subscriber registered in the public mobile communication network can be provided with only the public mobile communication service, while a subscriber registered in the private mobile communication network can be provided with only the private mobile communication service.

A public mobile communication network includes a plurality of mobile switching centers (MSCs), a plurality of base station controllers (BSCs), a plurality of base station transceiver subsystems (BTSs), and a plurality of mobile stations (MS) registered in the public mobile communication network.

A private mobile communication network includes a private mobile system with a radio interface (I/F), and a plurality of mobile stations registered in the private mobile communication network.

Mobile stations registered in the public mobile communication network can be provided with the mobile communication service only within the service area (or coverage) of the public mobile communication network, while the mobile stations registered in the private mobile communication network can be provided with the mobile communication service only within the service area of the private mobile communication network.

Therefore, the mobile communication system described above is disadvantageous in that a user of the mobile station cannot be provided with the mobile communication service if he or she moves out of the coverage of the mobile communication network in which the mobile station is registered.

Even a subscriber registered in both the public mobile communication network and the private mobile communication network must switch an operation mode of the mobile station when moving from one network to another network. That is, to access the private mobile communication network, a mobile station currently being serviced by the public mobile communication network must switch the operation mode to a private mobile communication network-use mode. On the contrary, to access the public mobile communication network, a mobile station currently being serviced by the private mobile communication network must switch the operation mode to a public mobile communication network-use mode.

Accordingly, there has been a demand for a method and apparatus for enabling the mobile terminal subscriber to be provided with both the public and private mobile communication services using one mobile terminal. Incorporated by reference herein are: U.S. Pat. No. 5,303,287 to Enrique Laborde entitled Integrated Personal/Cellular Communications Systems; U.S. Pat. No. 5,537,610 to Ray H. Mauger et al. entitled Mobile Communication Having Mobile Subscribers, PCN Network, PBX and Local Exchange; U.S. Pat. No. 5,890,064 to Ina Widergen et al. entitled Mobile Telecommunications Network Having Integrated Wireless Office System; U.S. Pat. No. 6,073,018 to Krister Sallberg entitled System And Method For Interworking Of Wireless Communication Systems With ISDN Networks; U.S. Pat. No. 6,073,029 to Dennis C. Smith entitled Method And System For Providing Wireless Communications To A Subscriber Of A Private Wireline Network, and U.S. Pat. No. 6,097,966 to Donald V. Hanley entitled Wireless Access For Local Exchange Carriers.

SUMMARY OF THE INVENTION

It is, therefore, an object of the present invention to provide a service apparatus with which a mobile station can be provided with both a public mobile communication service and a private mobile communication service.

To achieve the above and other objects, there is provided a service apparatus for a public and private mobile communication network in a mobile communication service system including a public mobile communication network and a private mobile communication network. The service apparatus includes a device for connecting a public mobile communication service system to a private mobile communication service system, and providing a mobile station in a predetermined service area with both a public mobile communication service and a private mobile communication service. The device includes a base station transceiver subsystem (BTS) located in the predetermined service area, for forming a radio channel to the mobile station in the service area; a communication path provider connected to the BTS, a base station controller (BSC) in the public mobile communication service system and a mobile switching center (MSC) of the private mobile communication service system, said communication path provider providing a communication path for transmitting data of the service system and data of the BTS; and a call manager for distinguishing the public mobile communication service from the private mobile communication service by analyzing data received through the communication path, and performing call management for the corresponding service.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
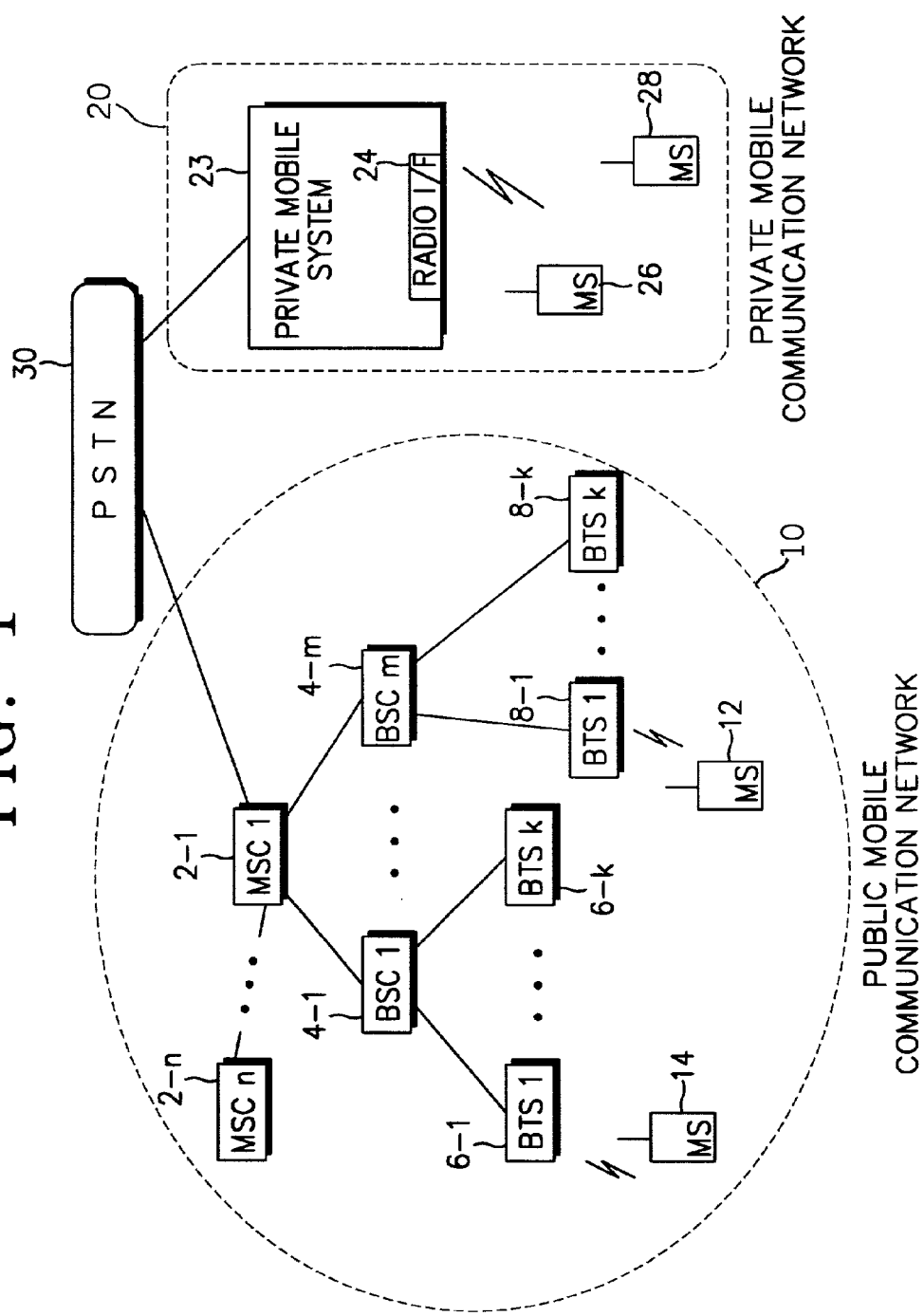
FIG. 1 is a diagram illustrating a mobile communication system in which a public mobile communication service and a private mobile communication service are available only in their associated networks.

FIG. 1 shows a mobile communication system designed such that the public mobile communication service is provided only in the public communication network and the private mobile communication service is provided only in the private communication network. Referring to FIG. 1, a public mobile communication network 10 includes a plurality of mobile switching centers (MSCs) 2-1 to 2-$n$, a plurality of base station controllers (BSCs) 4-1 to 4-$m$, a plurality of base station transceiver subsystems (BTSs) 6-1 to 6-$k$ and 8-1 to 8-$k$, and a plurality of mobile stations (MS) 12 and 14 registered in the public mobile communication network 10. A private mobile communication network 20 includes a private mobile system 22 with a radio interface (I/F) 23, and a plurality of mobile stations 26 and 28 registered in the private mobile communication network 20. In the system configuration of FIG. 1, the mobile stations 12 and 14 registered in the public mobile communication network 10 can be provided with the mobile communication service only within the service area (or coverage) of the public mobile communication network 10, while the mobile stations 26 and 28 registered in the private mobile communication network 20 can be provided with the mobile communication service only within the service area of the private mobile communication network 20.

Therefore, the mobile communication system of FIG. 1 is disadvantageous in that a user of the mobile station cannot be provided with the mobile communication service if he or she moves out of the coverage of the mobile communication network in which the mobile station is registered. In this case, the mobile stations 26 and 28 registered in the private mobile communication network 20 cannot access the public mobile communication network 10, thus unable to be provided with the public mobile communication service, while the mobile stations 12 and 14 registered in the public mobile communication network 10 cannot access the private mobile communication network 20, thus unable to be provided with the private mobile communication service. Even a subscriber registered in both the public mobile communication network 10 and the private mobile communication network 20 must switch an operation mode of the mobile station when moving from one network to another network. That is, to access the private mobile communication network 20, a mobile station currently being serviced by the public mobile communication network 10 must switch the operation mode to a private mobile communication network-use mode. On the contrary, to access the public mobile communication network 10, a mobile station currently being serviced by the private mobile communication network 20 must switch the operation mode to a public mobile communication network-use mode.

In an exemplary embodiment of the present invention, the system elements constituting a public mobile communication network (10 of FIG. 1) are provided independently of the system elements constituting a private mobile communication network (20 of FIG. 1). In order to allow the mobile station in a predetermined service area be able to be provided with both the public mobile communication service and the private mobile communication service, the embodiment includes an apparatus for interconnecting the two independent mobile communication networks 10 and 20. The predetermined service area will be referred to as public/private common mobile communication service area.

Figure 2:
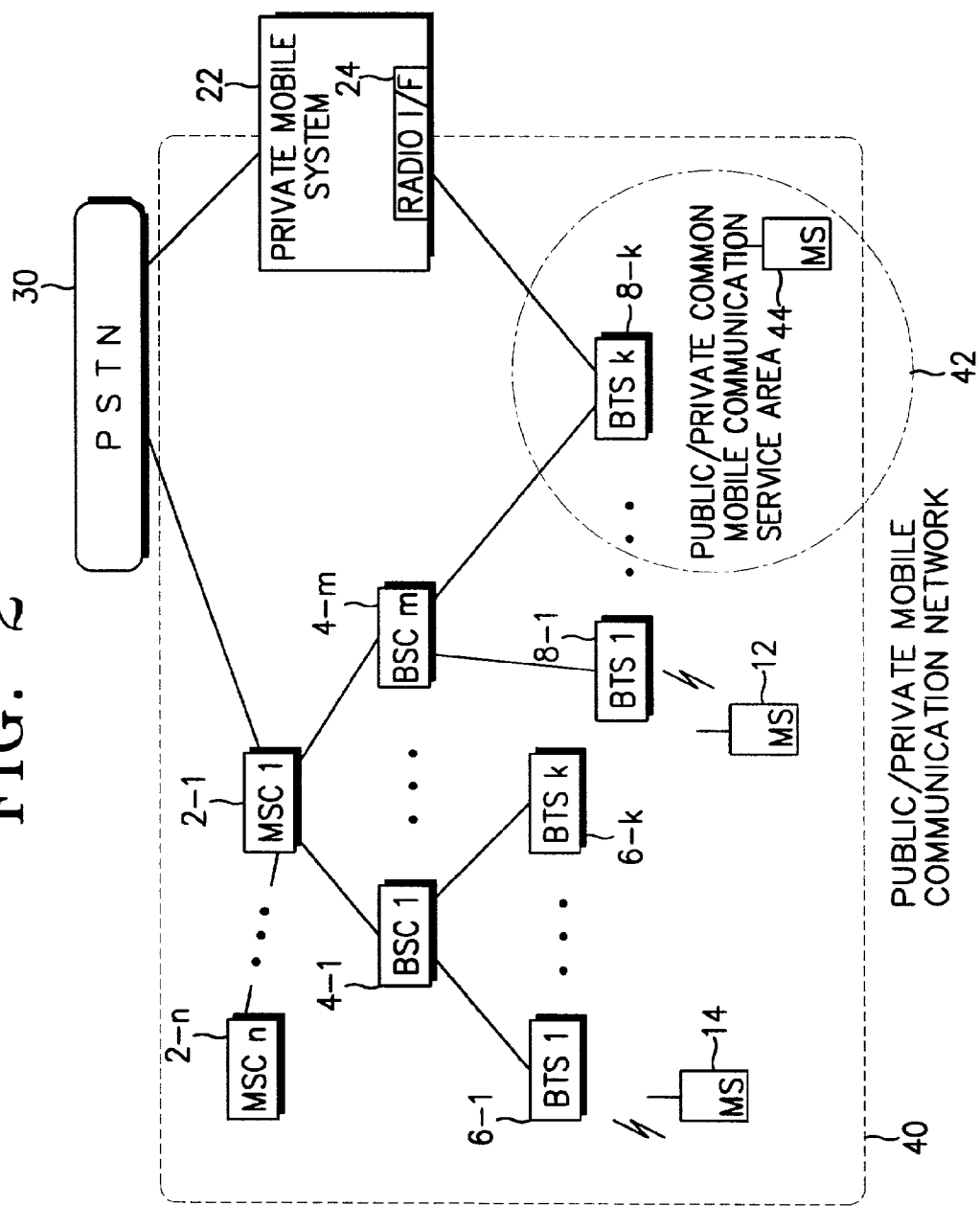
FIG. 2 is a public/private mobile communication network according to an embodiment of the present invention.
Figure 3:
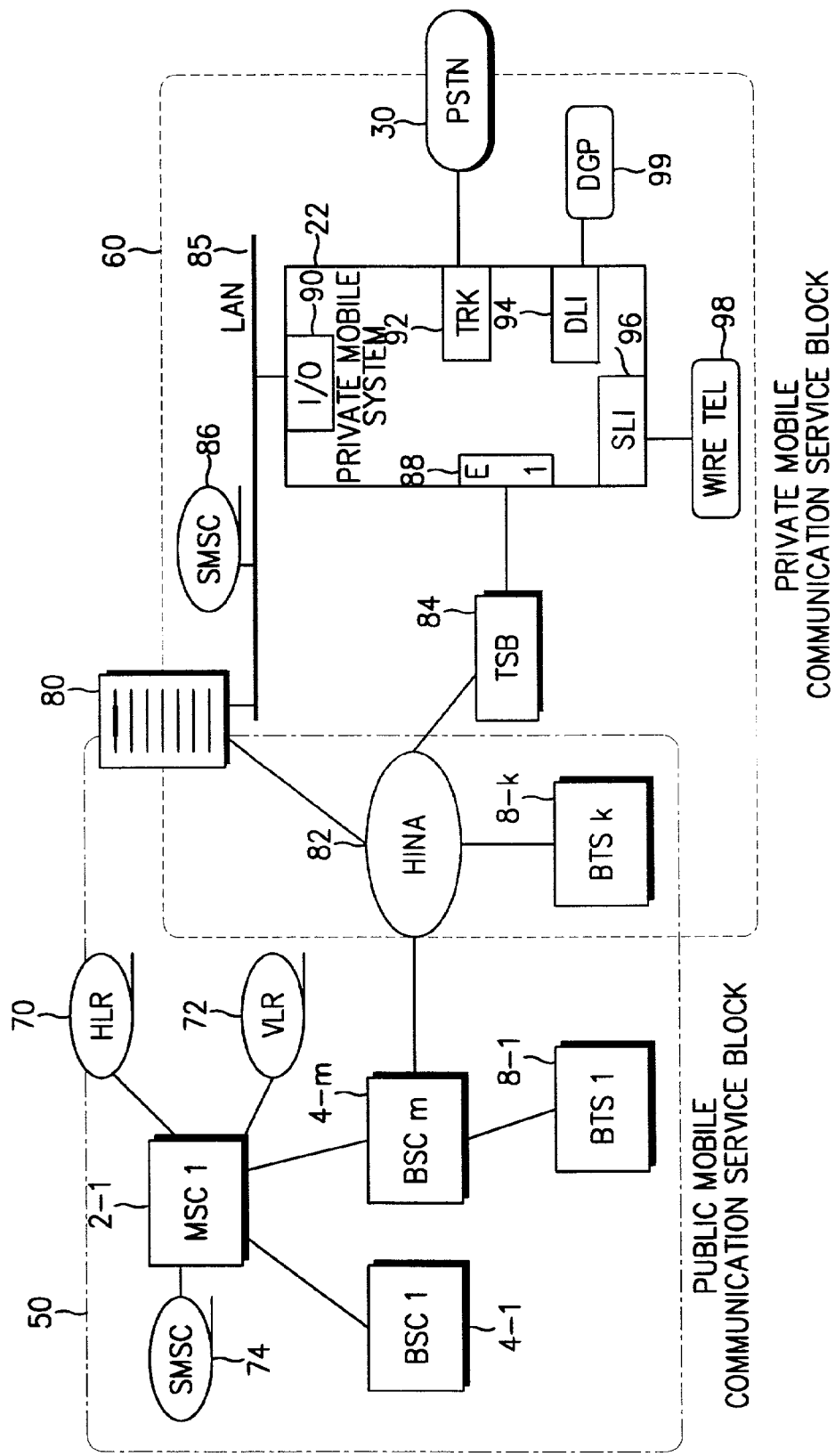
FIG. 3 is a diagram illustrating a mobile communication system capable of providing both a public mobile communication service and a private mobile communication service according to an embodiment of the present invention.

FIG. 2 shows a public/private mobile communication network according to an embodiment of the present invention, and FIG. 3 shows a mobile communication system capable of providing both a public mobile communication service and a private mobile communication service according to an embodiment of the present invention. The system of FIG. 3 includes the apparatus for interconnecting the two independent mobile communication networks.

Referring to FIG. 2, in a public/private mobile communication network 40 according to an embodiment of the present invention, a base station transceiver subsystem (BTS) 8-$k$, out of a plurality of BTSs 6-1 to 6-$k$ and BTSs 8-1 to 8-$k$, is connected in common to a base station controller (BSC) 4-$m$ in the existing public mobile communication network and a private mobile system 22 in the existing private mobile communication network. A service area (or coverage area) of the BTS 8-$k$ is defined as a public/private common mobile communication service area 42 according to an embodiment of the present invention.

The private mobile system 22 is a system for processing a radio call and a wire call. A private branched exchange (not shown) and an independent private mobile control system (not shown) can be typically used for the private mobile system 22. The private mobile system 22 includes a radio interface 24.

For reference, in the public/private mobile communication network 40 of FIG. 2, the mobile switching centers (MSCs) 2-1 to 2-$n$ each control the connection between their associated BSCs 4-1 to 4-$m$ and the Public Switched Telephone Network and Integrated Services Digital Network (PSTN) 30 or other MSCs in the public mobile communication network.

The BSCs 4-1 to 4-$m$ perform a radio link control function and a handoff function, and the BTSs 6-1 to 6-$k$ and BTSs 8-1 to 8-$k$ form radio communication paths to the mobile stations 12, 14 and 44 located in its communication service area (or cell area), and manage the radio resources.

In order to allow, for example, the mobile station 44 located in the public/private common mobile communication service area 42 to be able to be provided with both the public mobile communication service and the private mobile communication service, additional devices are provided in addition to the devices commonly included in the public mobile communication network and the private mobile communication network.

Referring to FIG. 3, a call manager (CM) 80, a high capacity IPC (Inter-Processor Communication) node board Assembly (HINA) 82, and a transcoder and selector bank (TSB) 84 are additionally provided. The HINA 82 has a function of providing a communication path, and is connected in common to the BTS 8-$k$ in the public/private common mobile communication service area 42 and the private mobile system 22 via the TSB 84 according to an embodiment of the present invention. The HINA 82 is also connected to the call manager 80 and BSC 4-$m$ for transmitting data.

The call manager 80 analyzes a received message, determines whether the received message is for the public mobile communication service or the private mobile communication service, and performs the service control correspondingly. The call manager 80 is a workstation having a function block for serving as the private BSC/MSC corresponding to the BSC/MSC of the public mobile communication network. In addition, the call manager 80 includes a visitor location register (VLR) for registering the mobile station intended to be provided with the private mobile communication service.

Moreover, the call manager 80 exchanges information with the private mobile system 22 via a local area network (LAN) 85 to control a switch (not shown) included in the private mobile system 22.

Every call control signal generated from the BTS 8-$k$ in the public/private common mobile communication service area 42 is provided to the call manager 80, which is interlinked with the private mobile system 22.

The TSB 84 is interposed between an E1 interface 88 of the private mobile system 22 and the HINA 82, and serves as an interface for providing a path for the voice or data cells. That is, the TSB 84 performs various functions for providing a traffic data path. More specifically, the TSB 84 manages a 2.048 Mbps/1.54 Mbps non-multiplexing transmission channel interfacing function, a vocoder function for voice coding and decoding ((e.g., PCM (Pulse Code Modulation)) ↔QCELP (Qualcomm Code Excited Linear Predictive coding)), a function of controlling a soft handoff call, an audio selecting function, and a power control function.

In FIG. 3, a block 50 includes the elements used for the public mobile communication service, and a block 60 includes the elements used for the private mobile communication service.

The elements for the public mobile communication service further include a Home Location Register (HLR) 70, a VLR 72, and a short message service controller (SMSC) 74. The HLR 70 performs a subscriber location registration function and a database function for storing the subscriber information. The VLR 72 serves as a database for temporarily storing information about the mobile station existing in the cell area managed by the associated MSC out of the MSCs 2-1 to 2-$n$. If the mobile station moves into a cell area managed by another MSC, the information stored in the VLR is deleted. The SMSC 74 serves as a controller for providing a short message service on the public mobile communication network.

Among the elements for the private mobile communication service, the private mobile system 22 includes an input/output (I/O) interface 90, a trunk interface (TRK) 92, a digital line interface (DLI) 94, a subscriber line interface (SLI) 96 and an E1 interface 88. The E1 interface 88 serves as the radio interface 24 of FIG. 2. The I/O interface 90 is connected to the LAN 85, the trunk interface 92 is connected to the PSTN 30, and the digital line interface 94 is connected to a digital phone (DGP) 99. Further, the subscriber line interface 96 is connected to a wire telephone 98, and the E1 interface 88 is connected to the TSB 84. In addition, the private mobile communication service block 60 includes an SMSC 86, connected to the LAN 85, serves as a controller for providing a short message service on the private mobile communication network.

Now, with reference to FIGS. 2 and 3, a detailed description will be made of a public mobile communication service and a private mobile communication service according to an embodiment of the present invention.

(1) Public Mobile Communication Service

To be provided with the public mobile communication service, the mobile station must be first registered in the HLR 70 connected to the MSC 2-1. A mobile station registration procedure is well known to those skilled in the art. The public mobile communication service according to an embodiment of the present invention will be described in detail after the mobile station is registered in the HLR 70.

1-1) Call Origination Service

If the mobile station 44 in the public/private common mobile communication service area 42 generates a call origination request message, then the generated call origination request message is sent to the call manager 80 through the BTS 8-$k$ and the HINA 82. The call manager 80 then determines whether the received call origination request message is equivalent to a public mobile communication service request or a private mobile communication service request, and sends the call origination request message to either the public mobile communication network or the private mobile communication network according to the determination results.

Determining by the call manager 80 whether the call origination request message is equivalent to the public mobile communication service request or the private mobile communication service can be implemented in the following methods.

In a first method, the user requiring the private mobile communication service dials a specific identification code in addition to the telephone number. In a second method, the private mobile communication service provided to the mobile station in the public/private common mobile communication service area 42 is previously set by time slot. That is, the call manager 80 includes time slot means (not shown) for distinguishing a public mobile communication service request from a private mobile communication request service request, wherein the time slot means is provided with a first time slot for enabling the public mobile communication service only and a second time slot for enabling only the private mobile communication service and each time slot is defined by a predetermined time period. In a third method, a mobile subscriber requiring the private mobile communication service is previously registered in the call manager 80 by the operator.

If the call origination request message is equivalent to the public mobile communication service request, the call manager 80 sends the call origination message to the MSC 2-1 via the HINA 82 and the BSC 4-$m$. The subsequent operation follows the common mobile communication service procedure.

If a call is set up by the call origination request message, the call manager 80 constantly sends the messages received subsequently from the BTS 8-$k$ to BSC 4-$m$ until the corresponding call is ended.

1-2) Call Termination Service

A call termination request message from the public mobile communication network is provided to the call manager 80 via the BSC 4-$m$ and the HINA 82. The call manager 80 then sends the call termination request message to its interior and the BTS 8-$k$. Further, the call manager 80 analyzes the call termination request message to determine whether there is service control to be processed by the call manager 80 itself, and disregards the call termination request message if there is no service control to be processed. Therefore, in this case, the call termination service is performed which is identical to the common public mobile communication termination service.

1-3) Other Functions (SMS (short message service), Data Call, and All Sorts of Functions)

The other functions are processed according to the characteristics of the corresponding services in accordance with the call processes 1-1) and 1-2). The SMS is serviced in the same method as the function provided in the existing public mobile communication service.

(2) Private Mobile Communication Service

A mobile station intended to be provided with the private mobile communication service in the public/private common mobile communication service area 42 must be registered in the call manager 80. The call manager 80 determines whether the corresponding call is for the public mobile communication service or the private mobile communication service, and processes the call correspondingly.

In one case, the traffic data path for the private mobile communication service can be comprised of the mobile station 44 in the public/private common mobile communication service area 42, the BTS 8-k, the HINA 82, the TSB 84, the switch in the private mobile system 22, and the wire terminal connected to the private mobile system 22.

In another case, the traffic data paths can be comprised of the mobile station 44 in the public/private common mobile communication service area 42, the BTS 8-k, the HINA 82, the TSB 84, the switch of the private mobile system 22, the TSB 84, the HINA 82, the BTS 8-k and a second mobile station in the public/private common mobile communication service area 42. A detailed description of the private mobile communication service according to an embodiment of the present invention will be given below.

2-1) Call Origination Service

A call origination request message generated by the mobile station 44 in the public/private mobile communication network 40 is provided to the call manager 80 via the BTS 8-k and the HINA 82. The call manager 80 determines whether the received call origination request message is equivalent to the public mobile communication service request or the private mobile communication service request, and sends the call origination request message to either the public mobile communication network or the private mobile communication network according to the determination results. In the public mobile communication call origination service, determining by the call manager 80 whether the call origination request message is equivalent to the public mobile communication service request or the private mobile communication service can be implemented in the same methods as stated above. Describing the methods again, in a first method, the user requiring the private mobile communication service dials a specific identification code in addition to the telephone number. In a second method, the private mobile communication service provided to the mobile station in the public/private common mobile communication service area 42 is previously set by time slot. In a third method, a mobile subscriber requiring the private mobile communication service is previously registered in the call manager 80 by the operator. The system operator may allow the call manager 80 to support or more of the above methods.

If it is determined that the call origination request message is equivalent to the private mobile communication service request, the call manager 80 sends the call origination request message to the internal BSC and MSC modules (not shown). Thereafter, each module performs call processing in the call processing process similar to the general call origination process. In addition, to form the traffic data path, the call manager 80 determines a radio channel and a channel of the TSB 84 by the BSC module and the MSC module, and then, sends a specific message to the private mobile system 22.

The private mobile system 22 forms the traffic data path by connecting a predetermined channel based on the specific message and controlling the switch in the private mobile system 22. The message is exchanged between the call manager 80 and the private mobile system 22 via the LAN 85. Thereafter, the call control is performed using the LAN 85 between the MSC or the call manager 80 and the corresponding BTS, for example, the BTS 8-k of FIGS. 2 and 3 is used as a private BTS for this call only.

2-2) Call Termination Service

If a terminating terminal is, for example, the mobile station 44 in the public/private common mobile communication service area 42 and an originating terminal is a wire telephone, the call termination message is sent to the MSC of the call manager 80 via the LAN 85. Meanwhile, if the terminating terminal is, for example, the mobile station 44 in the public/private common mobile communication service area 42 and the originating terminal is another mobile station in the public/private common mobile communication service area 42, the call termination message is generated by the MSC of the call manager 80. The MSC of the call manager 80 sends the call termination message to the BTS 8-k in the general radio call termination process. The BTS 8-k wirelessly transmits the call termination message to the corresponding mobile station 44. A termination response message of the mobile station 44 is sent to the call manager 80 via the BTS 8-k, and the call manager 80 analyzes the termination response message and determines to which one of the public mobile communication network and the private mobile communication network the termination response message is to be sent. If the termination response message is a message to be processed by the call manager 80 itself, the call manager 80 sends the termination response message to its internal modules. Thereafter, the corresponding BTS 8-k, the mobile station, the MSC module in the call manager 80, and the private mobile system 22 control the call according to the general call control process.

2-3) Other Functions (SMS, Data Call, and All Sorts of Functions)

The other functions are processed according to the characteristics of the corresponding services in accordance with the call processes 2-1) and 2-2). For the SMS, the service request is send to the MSC of the call manager 80 via the private SMSC 86, and subsequently, the SMS is processed in the general call processing process.

The invention has the following advantages. First, a specific mobile station can be provided with both the public mobile communication service and the private mobile communication service without any additional management. That is, it is possible to access the two independent networks while providing transparency to the user for the origination call, the termination call and other additional functions. Second, it is possible to provide the mobile station registered in both the public mobile communication network and the private mobile communication network, with both the public mobile communication service and the private mobile communication service, and the mobile subscriber can be provided with an additional service. Third, since the mobile station used for the public mobile communication network can access the private mobile communication network, the mobile station can be provided with various services of the general private mobile communication network.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A service apparatus for a public and private mobile communication network in a mobile communication service system including a public mobile communication network and a private mobile communication network, the service apparatus comprising:

a device for connecting a public mobile communication service system to a private mobile communication service system, and providing a mobile station in a predetermined service area with both a public mobile communication service and a private mobile communication service, said device including:
- a base station transceiver subsystem located in the predetermined service area, for forming a radio channel to the mobile station in the service area;
- a communication path provider connected to the base station transceiver subsystem, a base station controller in the public mobile communication service system and a mobile switching center of the private mobile communication service system, said communication path provider providing a communication path for transmitting data of the service system and data of the base station transceiver subsystem; and
- a call manager for distinguishing the public mobile communication service from the private mobile communication service by analyzing data received through the communication path, and performing call management for the corresponding service.

2. The service apparatus as claimed in claim 1, wherein the call manager distinguishes the public mobile communication service from the private mobile communication service by determining whether a specific identification code is added to a telephone number of the mobile station.

3. The service apparatus as claimed in claim 1, wherein the call manager distinguishes the public mobile communication service from the private mobile communication service based on information previously set by time slot.

4. The service apparatus as claimed in claim 1, wherein the call manager distinguishes the public mobile communication service from the private mobile communication service based on registration information of a mobile subscriber requiring the private mobile communication service.

5. An apparatus for connecting a public mobile communication service system to a private mobile communication service system, and providing a mobile station in a predetermined service area with both a public mobile communication service and a private mobile communication service, said apparatus comprising:
- a base station transceiver subsystem located in the predetermined service area, for forming a radio channel to the mobile station in the predetermined service area;
- a communication path provider connected to a base station transceiver subsystem, a base station controller in the public mobile communication service system and a mobile switching center of the private mobile communication service system, said communication path provider providing a communication path for transmitting data of the public mobile communication service system, data of the private mobile communication service system and data of the base station transceiver subsystem; and
- a call manager for distinguishing the public mobile communication service from the private mobile communication service by analyzing data received through the communication path, and performing call management for the corresponding service.

6. The service apparatus as claimed in claim 5, wherein the call manager distinguishes the public mobile communication service from the private mobile communication service by determining whether a specific identification code is added to a telephone number of the mobile station.

7. The service apparatus as claimed in claim 5, wherein the call manager distinguishes the public mobile communication service from the private mobile communication service based on information previously set by time slot.

8. The service apparatus as claimed in claim 5, wherein the call manager distinguishes the public mobile communication service from the private mobile communication service based on registration information of a mobile subscriber requiring the private mobile communication service.

9. The service apparatus as claimed in claim 5, wherein the communication path provider comprises a high capacity inter-processor communication node board assembly.

* * * * *